(12) United States Patent
Johnson et al.

(10) Patent No.: US 8,706,849 B1
(45) Date of Patent: Apr. 22, 2014

(54) SYSTEMS AND METHODS FOR INCREASING THE SCALABILITY IN A CLIENT/SERVER ENVIRONMENT

(75) Inventors: Peter E. Johnson, Lehi, UT (US); Mark E. Howarth, South Jordan, UT (US); Alan B. Butt, Orem, UT (US); Plinio Pimentel, Highland, UT (US); Anthony N. Sarra, Riverton, UT (US)

(73) Assignee: Crimson Corporation, Dover, DE (US)

( * ) Notice: Subject to any disclaimer, the term of this patent is extended or adjusted under 35 U.S.C. 154(b) by 1231 days.

(21) Appl. No.: 11/673,447

(22) Filed: Feb. 9, 2007

(51) Int. Cl.
*G06F 15/177* (2006.01)
(52) U.S. Cl.
USPC .......................................... 709/221
(58) Field of Classification Search
USPC .................. 709/221, 220, 223–225
See application file for complete search history.

(56) References Cited

U.S. PATENT DOCUMENTS

| 6,330,582 | B1 | 12/2001 | Kuo et al. |
| 6,351,761 | B1 * | 2/2002 | Cantone et al. ............... 709/202 |
| 6,731,605 | B1 | 5/2004 | Deshpande |
| 6,857,025 | B1 * | 2/2005 | Maruyama et al. ........... 709/235 |
| 6,883,033 | B2 | 4/2005 | Maruyama et al. |
| 2006/0167897 | A1 * | 7/2006 | Jones et al. ..................... 707/10 |

* cited by examiner

*Primary Examiner* — Tarcza H. Thomas
*Assistant Examiner* — Maceeh Anwari
(74) *Attorney, Agent, or Firm* — Austin Rapp & Hardman

(57) ABSTRACT

A method and system for polling an administrative system for one or more managed nodes is described. The administrative system is connected to a managed node. The administrative system is polled for data to be downloaded. A node list is sent to the administrative system. A connect list is received from the administrative system. The connect list is multicast to the one or more managed nodes.

8 Claims, 13 Drawing Sheets

SYSTEMS AND METHODS FOR INCREASING THE SCALABILITY IN A CLIENT/SERVER ENVIRONMENT

TECHNICAL FIELD

The present invention relates generally to computers and computer-related technology. More specifically, the present invention relates to systems and methods for increasing the scalability in a client/server environment.

BACKGROUND

Many businesses and other types of organizations have a number of computers that are used by employees. These computers are often interconnected to form a computer network. One or more system administrators may be responsible for managing the organization's computers. A system administrator's responsibilities typically include installing and configuring new hardware and software, assigning user accounts and passwords, establishing security access levels, performing backups, troubleshooting reported problems, and so forth. In larger organizations, some of these tasks may be divided between different system administrators. A computer system that is used by a system administrator is commonly referred to as an administrative system. The computers (or other electronic devices) that a system administrator manages may be referred to as managed nodes. An environment having an administrative system and a managed node may also be known as an environment including a server and a client.

Systems management software may be used to provide system administrators with the ability to remotely perform management operations on managed nodes. This remote management capability can save system administrators a significant amount of time because they are able to perform management operations on a managed node without the need to physically visit the managed node. An example of systems management software that is used by various organizations is the LANDESK® Management Suite. Systems management software enables a system administrator who is working at an administrative system to send management-related requests to managed nodes, which process and fulfill the requests.

Managed nodes may also query the administrative system for commands, data, files, and so forth that may be downloaded by the managed nodes for management purposes. This is often referred to as "polling" the administrative system. Managed nodes may also volunteer data to an administrative system. For example, a managed node may post a file or data to the administrative system, send an inventory scan to the administrative system, etc. In addition, managed nodes may send a query based request to the administrative system to request the administrative system to resolve something for the managed node.

Unfortunately, polling techniques as well as techniques to volunteer data and techniques to send query-based requests may be ineffective when multiple managed nodes attempt to connect to the administrative system. The time delay for the administrative system to respond to each of the multiple managed nodes may increase as the number of managed nodes connecting to the administrative system increases. Similarly, the amount of chattiness on the computer network also increases as the number of managed nodes connecting to the administrative system increases. The efficiency of the computer network may decrease as the amount of chattiness increases. Limitations of a server or network may contribute to the inefficiency of the computer network. For example, a broker system connected to the network may add a limitation on the number of connections that can be effectively brokered. In other words, the broker system may be the main bottleneck and the reason why a plurality of managed polling simultaneously may be ineffective.

System administrators are under a tremendous amount of pressure to perform their duties in an efficient and productive manner. Accordingly, benefits may be realized by improved systems and methods for increasing the scalability in a client/server environment in order to improve the efficiency of managing one or more managed nodes.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
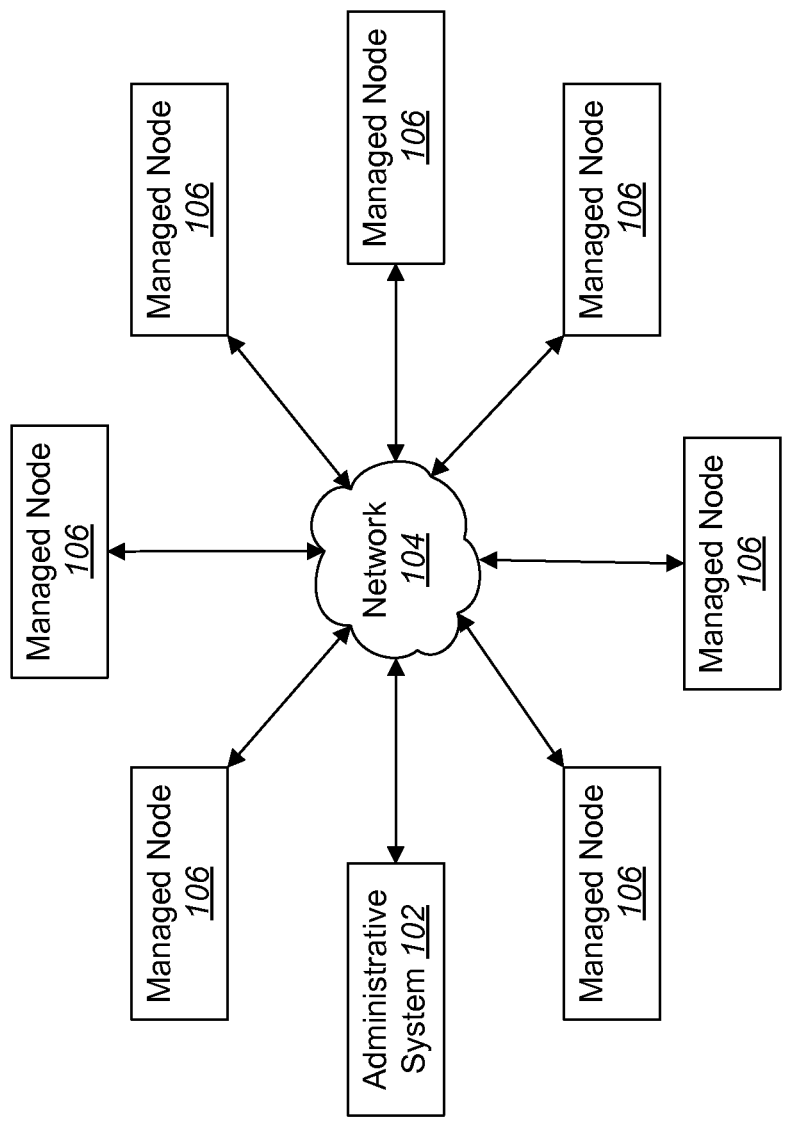
FIG. 1 illustrates an exemplary environment in which embodiments may be practiced, which includes an administrative system and a plurality of managed nodes.

A method and system for polling an administrative system for one or more managed nodes is described. The administrative system is connected to a managed node. The administrative system is polled for data to be downloaded. A node list is sent to the administrative system. A connect list is received from the administrative system. The connect list is multicast to the one or more managed nodes.

In one embodiment, the administrative system is connected through a broker system. The node list may include the identity of one or more managed nodes in a subnet. The administrative system may attempt to push data to one or more managed nodes. A push list may be generated that includes the one or more managed nodes the administrative system attempted to push data to.

In one embodiment, the node list and the push list are compared for one or more managed nodes included in both the node list and the push list. The one or more nodes included in both the node list and the push list may be included in the connect list. The one or more nodes included in the connect list may be connected to the administrative system through the broker system. In one embodiment, the data is pushed to the one or more nodes connected to the administrative system through the broker system. A polling agent may be installed on each of the one or more nodes.

A computer-readable medium comprising executable instructions for polling an administrative system for one or more managed nodes is also described. The administrative system is connected to a managed node. The administrative system is polled for data to be downloaded. A node list is sent to the administrative system. A connect list is received from the administrative system. The connect list is multicast to the one or more managed nodes.

A computer system that is configured to evaluate a client to function as a representative is also described. The computer system includes a processor and memory in electronic communication with the processor. Instructions are stored in the memory. A request to represent the client is receive. A determination is made if a client proxy parameter is satisfied. A determination is made if a maximum altitude parameter is satisfied. A request is sent to the client to elevate itself as a representative.

In one embodiment, the representative determines if the client currently represented is one less than the client proxy parameter. The client may volunteer data to a server through the representative. The client may send a query-based request to the server through the representative. In one embodiment, the client is installed with the proxy client parameter. The client may be installed with the maximum altitude parameter. The representative may send the volunteer data to the server when a volunteer data parameter is satisfied. The representative may send the query based requests to the server when a query request parameter is satisfied. In one embodiment, the representative sends the volunteer data and the query based requests to the server when a batch time parameter is satisfied.

A computer-readable medium comprising executable instructions for elevating a client to function as a representative is also described. A request to represent the client is received. A determination is made if a client proxy parameter is satisfied. A determination is made if a maximum altitude parameter is satisfied. A request is sent to the client to elevate itself as a representative.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

In a client/server environment, the scalability of the server is limited when a large number of clients simultaneously connect and send requests to the server. A large number of connections and requests may overwhelm the server because the number of connections is too large, or the amount of resources required to service the requests are unavailable. In a client/server environment, there may be two distinct types of data sent from the client to the server. The first type may include "volunteer" data. For example, this may include sending an email, posting a file or data to the server, sending an inventory scan to the server, etc. The second type of data may include a request for the server to resolve a certain issue for the client. These types of requests may be referred to as "query based" requests. For example, this may include execution of a Standard Query Language (SQL) query on a client machine against a database on the server, the client polling the server for commands, data, files, and so forth that the client may download, the client requesting the server for email messages stored on the server, requests to service a web page, etc.

A common way to attempt to improve the scalability of the server is for the client to send requests asynchronously to the server by staggering when the requests are sent at random times. However, this provides an increased amount of "chattiness" on the network because multiple clients may be sending many requests to the server. For example a plurality of clients may connect to the server at the same time in order to poll the server. Each client connects to the server regardless of whether the server has new data for the client to download. This approach also increases the time delay that the client experiences in order for the server to respond to the request. For example, the greater the number of clients that connect to the server, the larger the time delay will be for each client to be serviced by the server. This increased time delay may cause a bottleneck of client connections with the server, which may significantly reduce the efficiency of the server as well as the client.

FIG. 1 illustrates an exemplary environment in which embodiments may be practiced. An administrative computer system 102 is connected to a computer network 104. The administrative system 102 may be used to manage other computer systems that are also connected to the computer network 104. These other computer systems will be referred to herein as managed nodes 106 or alternatively, as clients. The managed nodes 106 may be personal computers, servers, printing devices, personal digital assistants (PDAs), cellular telephones, and so forth. The network 104 may include various components (such as routers, gateways, hubs, etc.) which allow the administrative system 102 and the managed nodes 106 to communicate via wired and/or wireless media.

Figure 2:
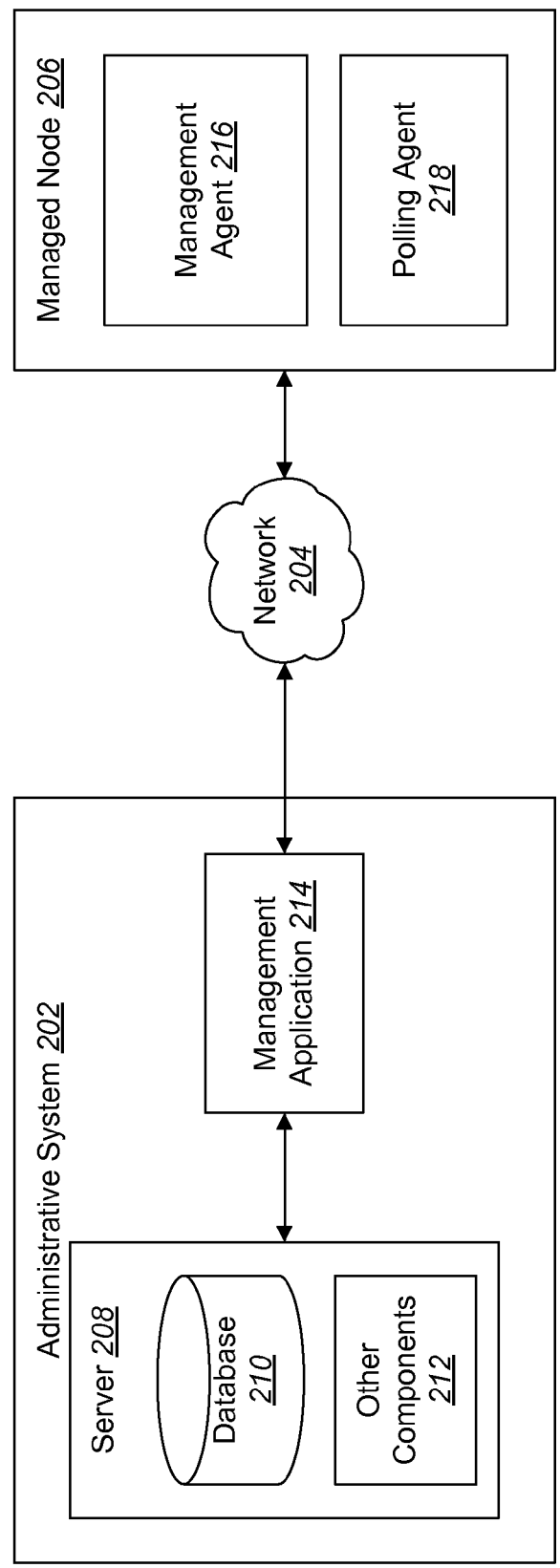
FIG. 2 is a block diagram of an administrative system and a managed node illustrating various management tools that facilitate remote management of a managed node.

FIG. 2 is a block diagram of an administrative system 202 and a managed node 206 illustrating various management tools that facilitate remote management of a managed node 206. The administrative system 202 may include a management server 208. The management server 208 may include a database 210 of information. The database 210 may include information about the managed node 206, and also about other managed nodes (not shown) that are connected to the computer network 204, and that the administrative system 202 is responsible for managing. The management server 208 may also include various other components 212 that are configured to perform tasks such as scheduling, handling alerts, and so forth. An example of a management server 208 that may be used is the core server for the LANDESK® Management Suite.

The administrative system 202 may also include a management application 214. The management application 214 may be used to perform various tasks related to the management of the managed node 206 and other managed nodes that are connected to the computer network 204. There are many different kinds of remote management operations that a system administrator may want to perform on the managed node 206. Some examples of remote management operations that may be performed include problem resolution, remote control, software distribution, software license monitoring, operating system imaging and migration, IT asset management, and so forth. As part of performing these tasks, the management application 214 may connect to the management server 208 and query the management server 208 for information. An example of a management application 214 that may be used is the console application for the LANDESK® Management Suite.

The managed node 206 may include a management agent 216. The management agent 216 performs management-related tasks in response to requests from the management application 214. An example of a management agent 216 that may be used is the LANDESK® Management Agent.

In order to remotely perform a management operation on the managed node 206, a system administrator may input instructions to the management application 214 regarding the desired management operation. Upon receiving the user's instructions, the management application 214 may send one or more management commands to the management agent 216 on the managed node 206. Upon receiving and processing the management command(s), the management agent 216 may perform the desired management operation. The management agent 216 may send a report back to the management application 214 regarding whether the management operation was successfully performed.

The managed node 206 may also include a polling agent 218. The polling agent 218 performs polling-related tasks, such as, polling the administrative system 202 to determine if any commands, data, files, and so forth may be downloaded by the managed node 206. The polling agent 218 may be programmed to poll the administrative system 202 at regular intervals for any commands, data, files, and so forth that may be downloaded by the managed node 206. The polling agent 218 may also send data volunteered to the server as well as query-based requests.

The components that are shown in FIG. 2 are examples of management tools. Management tools may enable a system administrator to perform a variety of management operations on the managed node 206 remotely (e.g., while working at the administrative system 202). However, as indicated above, management tools may be less effective when a plurality of managed nodes attempt to connect to the administrative system 202 during the same time period. The plurality of managed nodes may connect to the administrative system 202 at the same time in order to poll the administrative system 202, volunteer data to the administrative system 202, or send a query-based request to the administrative system 202. When one or more managed nodes are to poll the administrative system 202, a polling system may be used.

Figure 3:
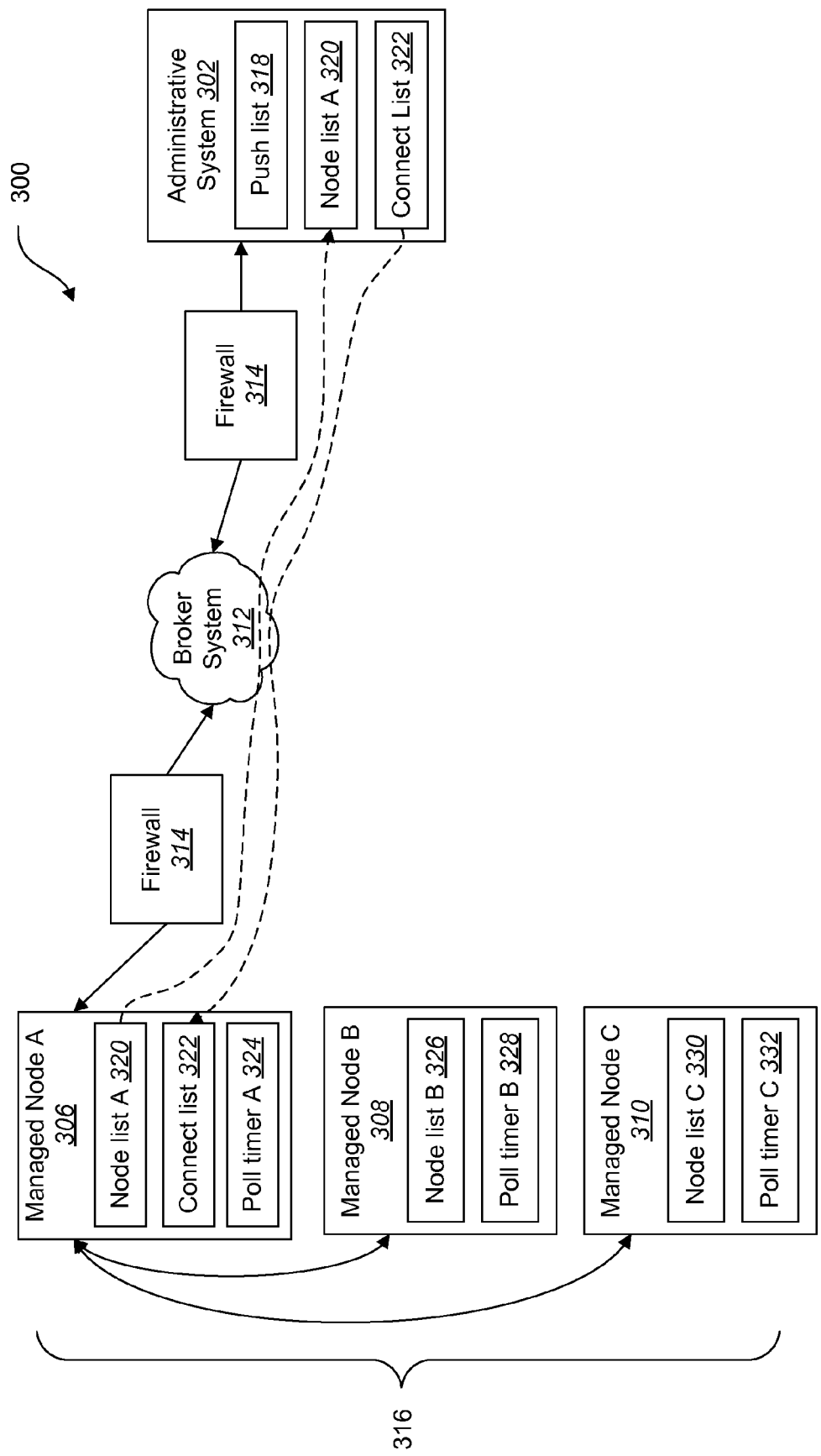
FIG. 3 is a network block diagram illustrating one embodiment of a polling system.

FIG. 3 is a network block diagram illustrating one embodiment of a polling system 300. As previously discussed, when multiple managed nodes attempt to connect to the administrative system 302 at the same time, a bottleneck of connections may occur. This bottleneck limits the scalability of the administrative system 302 by increasing the chattiness on the network and by increasing the time delay that each managed node waits in order to connect to the administrative system 302 in order to poll the administrative system 302 for commands, data, files, and so forth the managed nodes may download. In order to reduce the problems associated with such bottlenecks, the polling system 300 may be used.

The polling system 300 allows multiple managed nodes 306, 308, and 310 to poll the administrative system 302 to discover if the administrative system 302 has any commands, data, files, and so forth that the managed nodes 306, 308, 310 may download. While only three managed nodes (managed node A 306, managed node B 308, and managed node C 310) are depicted in FIG. 3, the system 300 may include additional managed nodes.

Managed node A 306 may poll the administrative system 302 by connecting to a broker system 312. The broker system 312 is used to allow the remote managed node A 306 to connect to the administrative system 302 through a firewall 314. In one embodiment, the administrative system 302 and managed node A 306 each initiate communication with the broker system 312. The broker system 312 maintains a table of connections (not shown) with identifying information about each managed node 306, 308, 310 and each administrative system 302 that may be connected together. In one embodiment, the broker system 312 is a meeting location on the Internet where managed node A 306 and the administrative system 302 are connected together. Once connected, managed node A 306 may poll the administrative system 302 and the administrative system 302 may manage node A 306. For example, managed node A 306 may poll the administrative system 302 for commands, data, files, and so forth that managed node A 306 may download. The administrative system 302 may then push the commands, data, files, and so forth to managed node A 306. In a further embodiment, the administrative system 302 may first attempt to push data to the managed nodes 306, 308 and/or 310. The administrative system 302 may include a push list 318 which may include the identities of the managed nodes the administrative system 302 attempted to push data to.

As illustrated, managed node A 306 is part of a subnet 316. The subnet 316 may include additional managed nodes such as managed node B 308 and managed node C 310. In one embodiment, managed node A 306 may connect to the administrative system 302 through the broker system 312 in order to poll the administrative system 302. While connected to the administrative system 302, managed node A 306 may send node list A 320, which includes information relating to managed node B 308 and managed node C 310, to the administrative system 302. The administrative system 302 may compare node list A 320 with the push list 318 and send a connect list 322 to managed node A 306 that pertains to managed nodes B 308 and C 310. During this polling period, managed nodes B 308 and C 310 do not literally connect to the administrative system 302 via the broker system 312. The number of connections per polling period is therefore reduced to one (managed node A 306) instead of three (managed nodes A 306, B 308, and C 310) per polling period. Reducing the number of connections per polling period improves the scalability of the administrative system 302 by reducing the chattiness on the network as well as the time delay.

Managed node A 320 may also include poll timer A 324. Managed node B 308 may include poll timer B 328 and similarly, managed node C 310 may include poll timer C 332. The poll timers 324, 328 and 332 determine when a particular managed node should connect to and poll the administrative system 302. Managed node B 308 and managed node C 310 may also include node list B 326 and node list C 330, respectively. In one embodiment, if poll timer B 328 expires, managed node B 308 may connect to and poll the administrative system 302. Managed node B 308 may send node list B 326 to the administrative system 302 and managed node B 308 may receive the connect list 322 in a similar manner as previously described. Node list B 326 may include the identity of managed node B 308 and the managed nodes in the subset of managed node B 308. In one embodiment, managed node C 310 may be included in node list B 326.

In a similar manner, managed node C 310 may connect to and poll the administrative system 302 if poll timer C 332 expires. Managed node C 310 may send node list C 330 to the administrative system 302 and the administrative system 302 may send the connect list 322 to managed node C 310 in a manner previously described. Further details regarding the polling system 300 will be described below in connection with a polling method 400.

Figure 4:
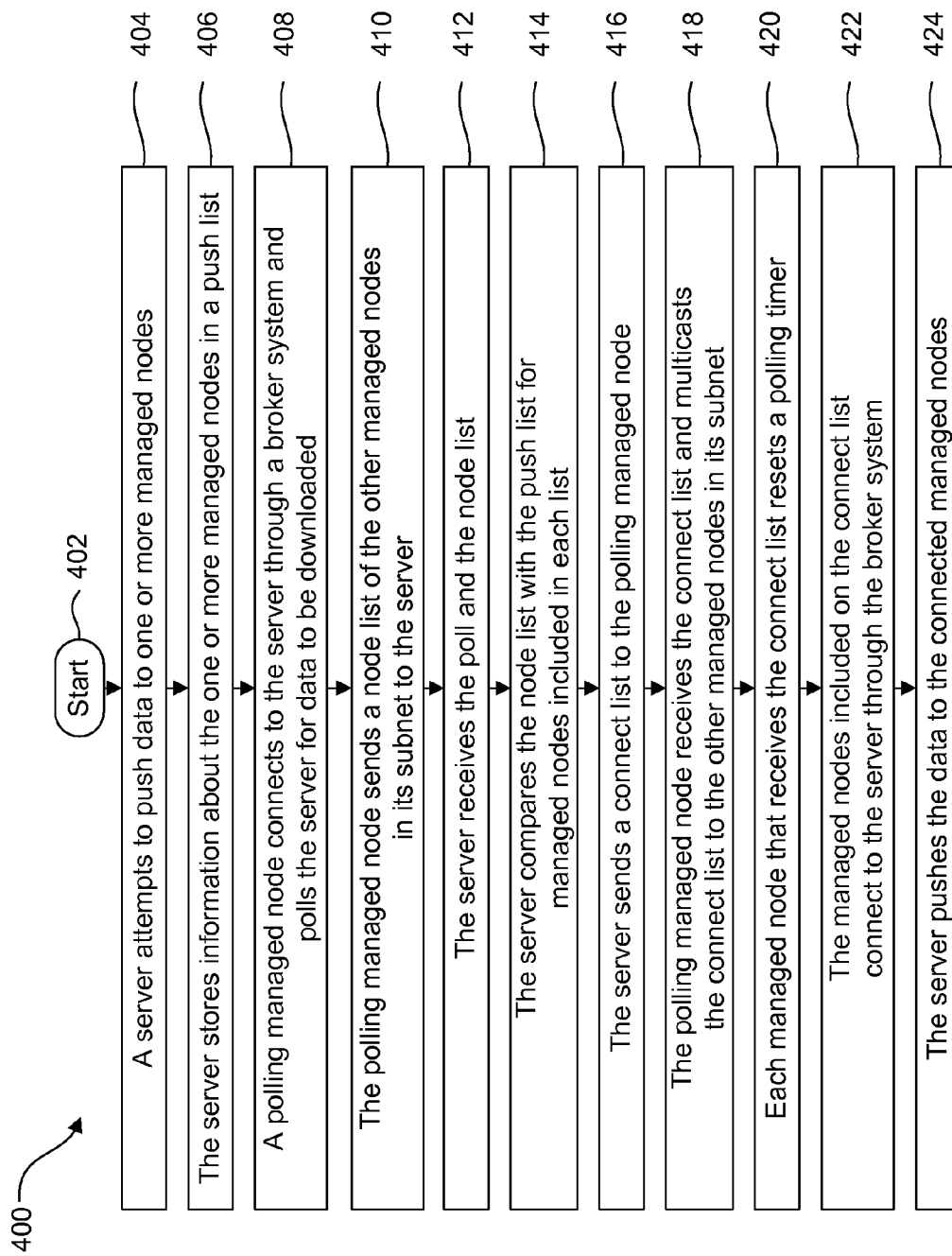
FIG. 4 is a flow diagram illustrating one embodiment of a polling method.

FIG. 4 is a flow diagram illustrating one embodiment of the polling method 400 that may be used with the polling system 300 described in FIG. 3. The polling method 400 reduces the number of connections between the managed nodes 106 and the administrative system 102. The reduction of connections may be desired when one or more managed nodes attempt to connect to the administrative system 102 in order to poll the system 102 for commands, data, files, and so forth that the one or more managed nodes may download. The reduction of connections increases the scalability of the administrative system 102 by decreasing the amount of chattiness across the network as well as decreasing the time delay.

As previously explained, the administrative system 102 may be referred to as a server in a general sense in that it 102 provides data to a number of other systems. However, the use of the term server herein includes peer-to-peer networks and is not limited to a strict client/server relationship. The method 400 begins 402 and a server attempts to push 404 data to one or more managed nodes. In one embodiment, the server is the management server 208 as discussed in FIG. 2. After attempting to push the data to one or more managed nodes, the server may create and store 406 information about the one or more managed nodes in a push list. The push list may include the identity of each managed node the server attempted to push data to.

The method 400 continues and a polling managed node may connect 408 to the server through the broker system 312 and poll the server for data to be downloaded. In one embodiment, the polling managed node may be managed node A 306 as discussed in FIG. 3. In addition to polling the server, the polling managed node sends 410 a node list to the server. The node list may include information regarding the managed nodes in the subnet of the polling managed node. In the example of FIG. 3, managed nodes B 308 and C 310 are included in the subnet of the polling managed node and, as a result, would be in the node list. The node list may include the identity and location of nodes B 308 and C 310. In another embodiment, there may not be a managed node in the subnet of the polling managed node. For example, the polling managed node sends the node list with only the identity and location of the polling managed node.

The method 400 proceeds and the server receives 412 the poll with the node list from the polling managed node. The server compares 414 the node list with the push list generated and stored on the server. The server determines if one or more managed nodes are included in both the push list and the node list. After the server has compared the push list and the node list and identified if any of the one or more managed nodes are common to both the node list and the push list, the server sends 416 a connect list to the polling managed node. The connect list includes the identities and locations of the one or more managed nodes that are included in both the push list and the node list. In one embodiment, the connect list may be empty (may not have the identity and location of any managed nodes) because there may not be any common managed node on both the node list and the push list.

The polling managed node receives the connect list and multicasts 418 the connect list to the managed nodes in its subnet. Each managed node that receives the connect list from the polling managed node resets 420 an individual polling timer. For example, the polling managed node may multicast 418 the connect list to managed nodes B 308 and C 310 because these managed nodes are in the subnet of the polling managed node. When nodes B 308 and C 310 receive the connect list, they each reset their respective polling timer. The polling timer is reset because nodes B 308 and C 310 each received information they would have received had they each polled the server individually. If, however, the polling managed node fails to poll the server and does not multicast 418 the connect list before the expiration of the polling timer of a managed node in the subnet, a managed node with an expired timer may connect to and poll the server through the broker system 312. For example, the polling managed node may fail to poll the server which results in no multicast of the connect list to the nodes in its subnet 316 before the expiration of the polling timer of managed node B 308. Managed node B 308 may then poll 408 the server by connecting through the broker system 312. With the poll, managed node B 308 may send 410 a node list including information about the managed nodes in the subnet of managed node B 308. The server may compare 414 the received node list with the push list and send 416 the connect list to managed node B 308. Managed node B 308 may then multicast 418 the connect list to the managed nodes in its subnet and each managed node resets their respective polling timer upon receiving the connect list. If managed node B 308 also fails to poll the administrative system 302 and does not multicast the connect list before the expiration of the polling timers of the managed nodes in its subnet, another managed node will poll the server by connecting to the system 302 through the broker system 312. Each managed node in the polling system 300 may include the polling agent 218 which facilitates polling the server, by connecting through the broker system 312, for commands, data, files, and so forth that may be downloaded.

After the polling managed node multicasts 418 the connect list to each node in its subnet and each node resets 420 their respective polling timer, the managed nodes included in the connect list connect 422 to the server individually through the broker system 312. After the managed nodes included in the connect list have connected 422 to the server, the server pushes the data to the managed nodes. For example, and again referring to the embodiment of FIG. 3, the polling managed node may multicast the connect list to managed nodes B 308 and C 310 because they are in the subnet of the polling managed node. Managed node C 310 may connect to the server via the broker system 312 because it is included in the connect list. After managed node C 310 connects to the server, the server pushes data to managed node C 310. Managed node B 308 does not connect to the server because it was not included in the connect list (the server does not have any commands, data, files, and so forth that managed node B 308 should download).

In another embodiment, both managed nodes B 308 and C 310 are included in the connect list. Nodes B 308 and C 310 may both connect to the server via the broker system 312. In one embodiment, both the nodes connect to the server through the broker system 312 at the same time. In another embodiment, each node connects separately to the server via the broker system 312. For example, the managed node B 308 may first connect to the server through the broker system 312. After the server pushes the data to the managed node B 308, the node B 308 disconnects from the server and the node C 310 connects. The server then pushes the data to the node C 310. In order to facilitate managed nodes to connect at different times, the server may include time slots for each managed node to use. Alternatively, the polling managed node may assign time slots for the various managed nodes. In a yet further embodiment, each managed node may randomly initiate a connection to the server in order to avoid having all the nodes on the connect list connect to the server at the same time.

Figure 5:
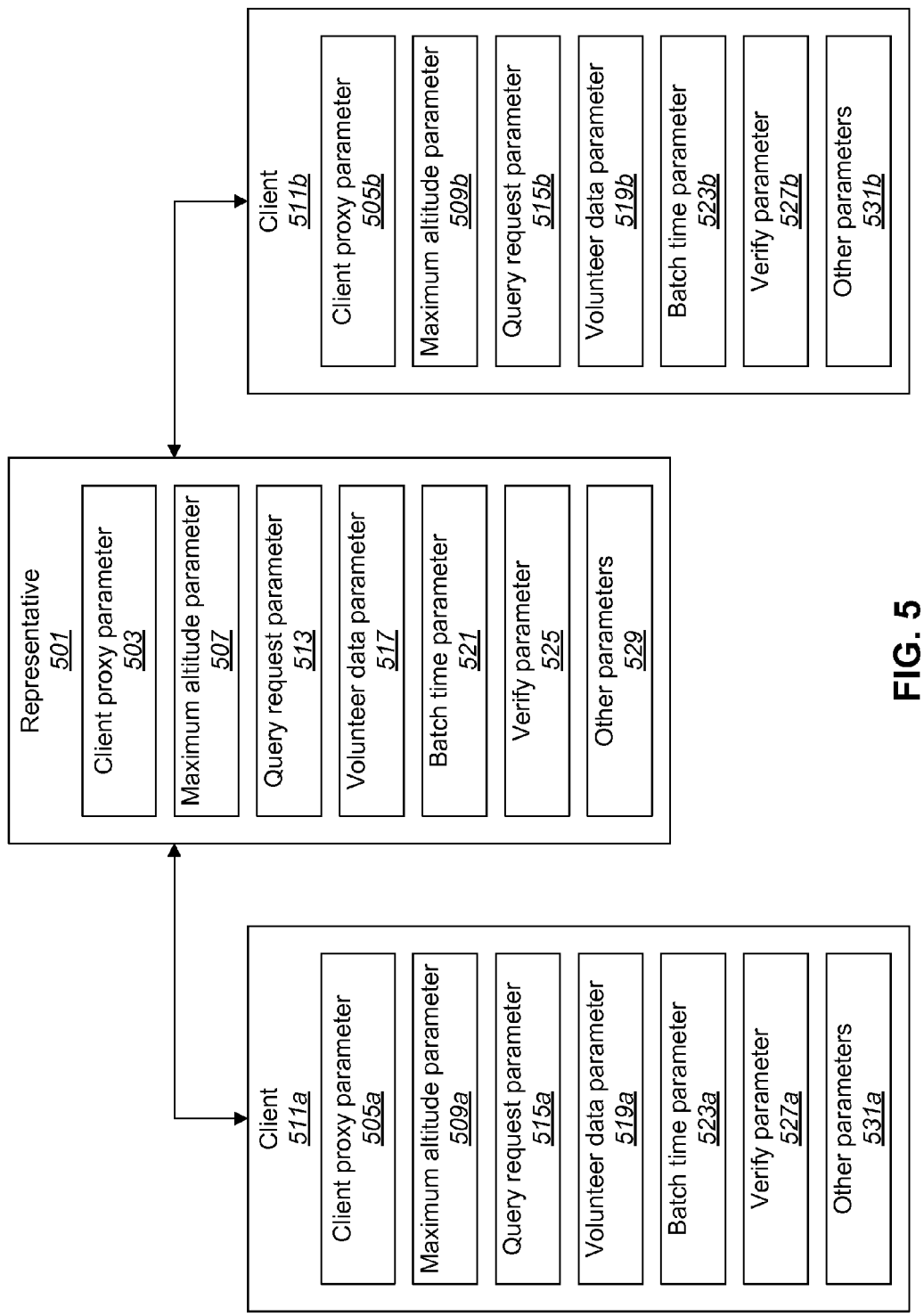
FIG. 5 is a block diagram of a representative and a client illustrating various tools that facilitate polling a server.

FIG. 5 is one embodiment of a representative 501 and a plurality of clients 511a, 511b. In one embodiment, the representative 501 and/or clients 511a, 511b may be managed nodes. The representative 501 may include a client proxy parameter 503. As shown, each client 511a, 511b may also include a client proxy parameter 505a, 505b. The client proxy parameter indicates the number of clients a representative may represent.

A maximum altitude parameter 507 may also be included on the representative 501. Each client 511a, 511b may also include a maximum altitude parameter 509a, 509b. The altitude parameter may indicate how many levels of representatives may be allowed in a subnet.

In addition to the client proxy parameter and the maximum altitude parameter, the representative 501 and clients 511a, 511b may include additional parameters. For example, the representative 501 and clients 511a, 511b may include a query request parameter 513, 515a, 515b, a volunteer data parameter 517, 519a, 519b, a batch time parameter 521, 523a, 523b, and a verify parameter 525, 527a, 527b. The volunteer and request parameters may indicate the quantity of volunteer data and query-based requests a representative collects before sending such information to another representative or to a server. The batch time parameter may indicate the length of time a representative waits before sending requests received from clients and other representatives. The verify parameter may indicate how often a representative or client verifies if their current representative is still available to provide representation. Additional details relating to these parameters will be discussed below.

In addition, the representative 501 and clients 511a, 511b may be installed with additional parameters 529, 531a, 531b, respectively. For example, a maximum CPU usage parameter to indicate the maximum amount of CPU usage for each representative, bandwidth throttling options if a client is elected to become a representative, whether or not the connection between a client and a representative is synchronous or asynchronous, etc.

Figure 6:
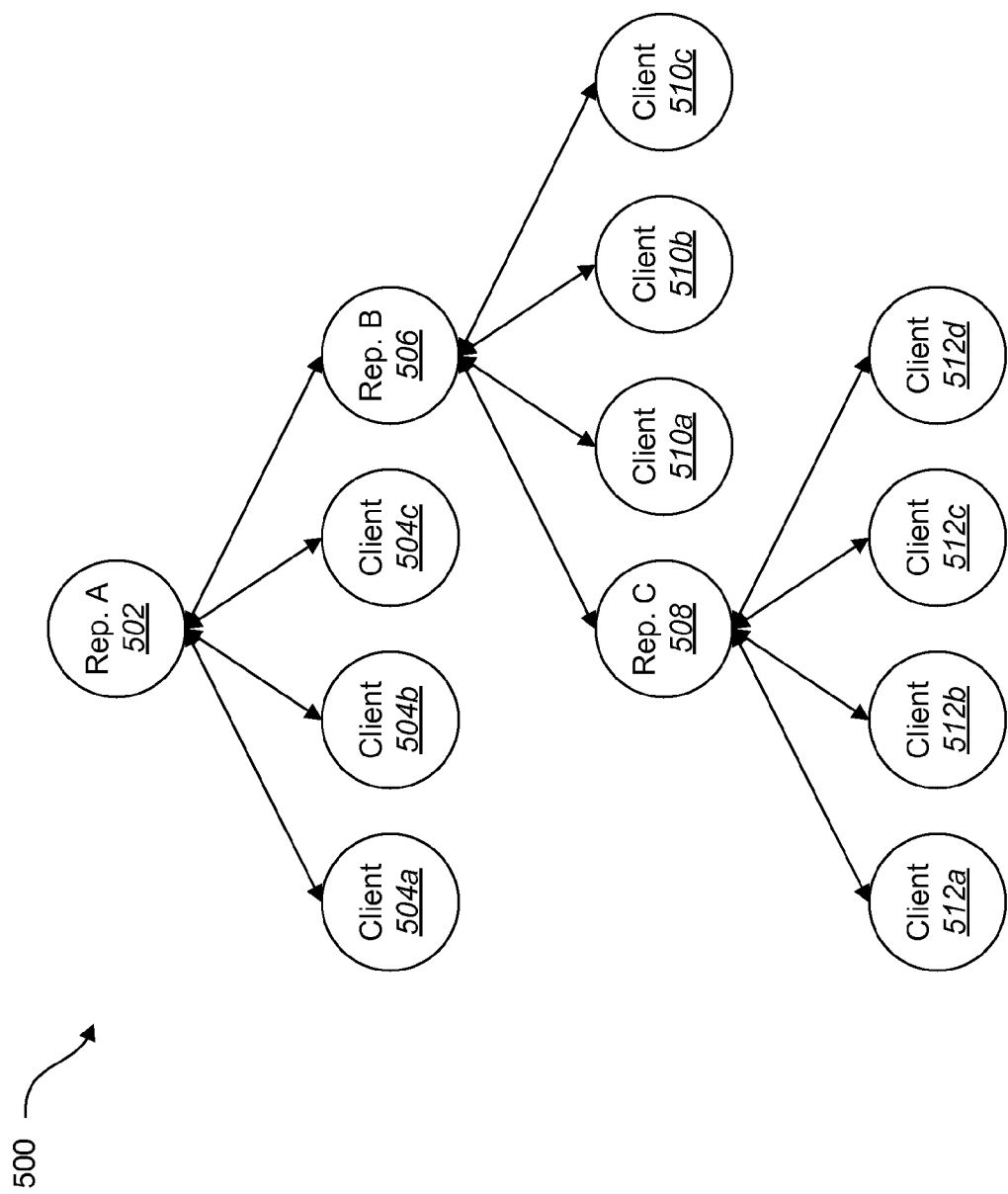
FIG. 6 is a functional block diagram illustrating one embodiment of an organizational subnet.

FIG. 6 is one embodiment of an organizational subnet 500. The subnet 500 may be included as one of the subnets discussed herein. As illustrated, the subnet 500 includes nodes depicted as either representatives or clients. In one embodiment, the representatives may be representative 501 and the clients may be the clients 511a, 511b of FIG. 5. The distinction between representatives and clients will be described below. The subnet 500 may be utilized to improve the scalability of the server when multiple clients attempt to connect to the server. The organization of the subnet 500 may reduce the chattiness on the network as well as reduce the time delay.

The subnet 500 may be organized into varying hierarchy (or altitude) levels where a representative represents one or more clients. When a representative represents a client, the clients may volunteer data to and send requests to a server via the representative. Similarly, the server may send information and requests to the client via the representative. For example, representative A 502 may represent one or more clients 504a, 504b, 504c. The clients 504a-c may volunteer data to and send requests to a server via representative A 502. The server may in turn send information and requests to the clients 504a-c via representative A 502.

As illustrated, representative A 502 may be enabled to represent up to four clients. The fourth client 506 represented by representative A 502 may be elevated from a client to representative B 506. Because each of the clients 504a-c are included with the client proxy parameter 503, any of the clients 504a-c may be elevated to become a representative. Similarly, as explained in FIG. 2, each client may include the polling agent 218 which may poll the server, send volunteered data to the server, and send query-based requests to the server.

Representative B 506 and the clients 504a-c communicate information to and receive information from the server via representative A 502. Representative B 506 may also now represent a certain number of clients. As depicted, representative B 506 may represent several clients 510a-c and the fourth client 508 may be elevated to representative C 508. Representative C 508 and the clients 510a-c at its level communicate information to and receive information from the server via representative B 506. Representative C 508 may also represent a certain number of clients. For example, representative C 508 may represent the lowest level of clients 512*a-d* shown in FIG. 5. As illustrated, none of the clients 512*a-d* represented by representative C 508 are elevated to become a representative.

As previously explained each client and representative may include a maximum altitude parameter. The altitude parameter may indicate how many levels of representatives may be allowed in the subnet 500. For example, the depicted subnet 500 has an altitude level of three representatives. Representative A 502 including its clients 504*a-c* may comprise the first level. Representative B 506 including its clients 510*a-c* may comprise the second level. Representative C 508 including its clients 512*a-d* may comprise the third and final level in the subnet 500. The maximum altitude parameter limits the levels of representatives and their respective clients in the subnet 500. Representative C 508 does not instruct one of its clients 512*a-d* to elevate itself as a representative because the maximum altitude parameter is satisfied.

Figure 7:
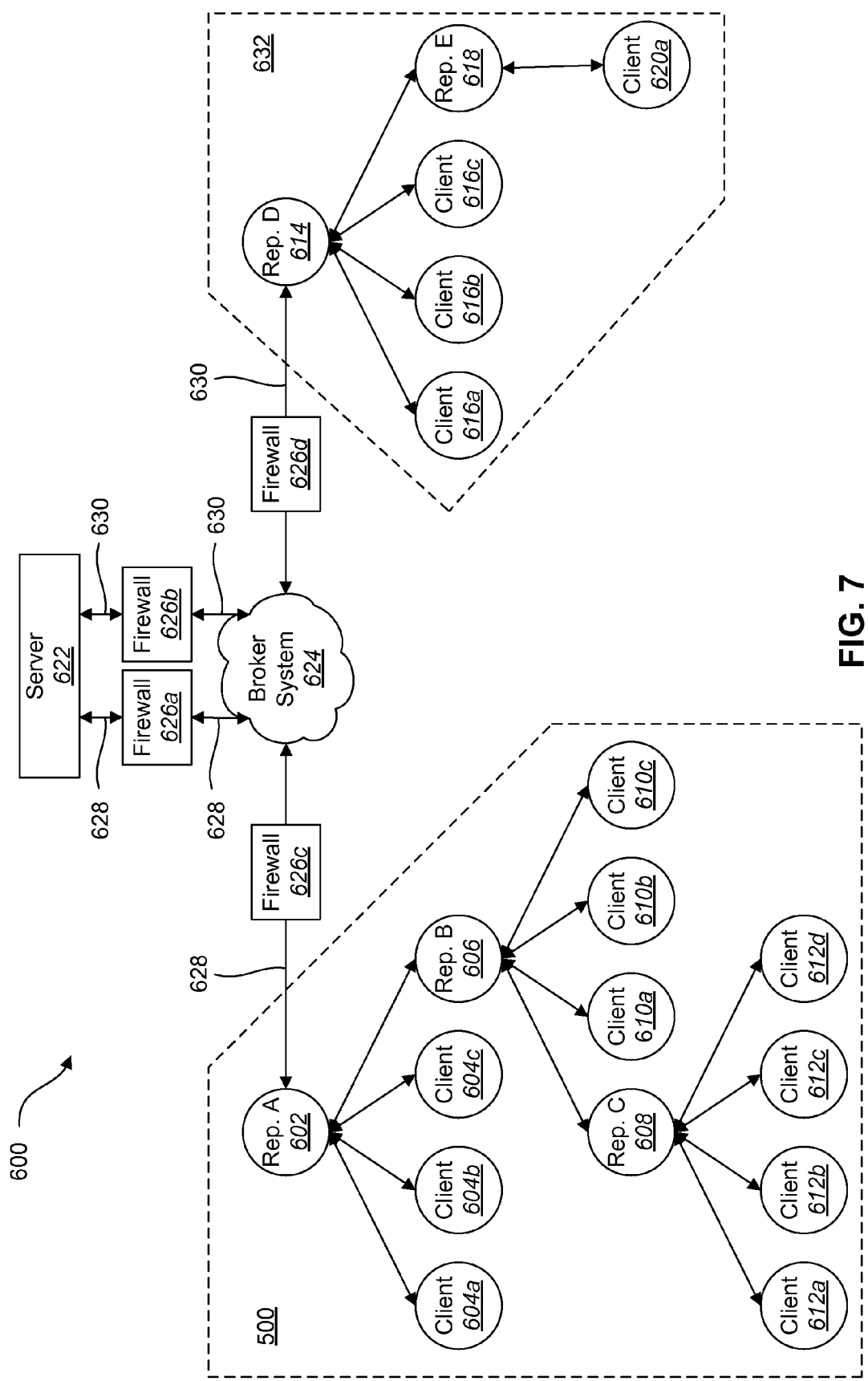
FIG. 7 is a functional block diagram illustrating one embodiment of the polling system combined with the organizational subnet.

FIG. 7 is one embodiment 600 of the polling system 300 as discussed in FIG. 3 combined with the subnet 500 as discussed in FIG. 5. The illustrated embodiment 600 may include two separate subnets, 500 and 632. It is to be understood that additional subnets may also be used in the embodiment 600. The subnet 632 includes representative D 614 which represents its clients 616*a-c* and representative E 618. Representative E 618 represents its client 620*a*. As illustrated, representative A 602 and representative D 614 may connect to a server 622 through a broker system 624. As previously mentioned, the broker system 624 allows representatives A 602 and D 614 to connect to the server 622 through one or more firewalls 626. The broker system 624 may allow representative A 602 to connect through a connection 628 while representative D 614 may connect to the server 622 through a separate connection 630. In another embodiment, representatives A 602 and D 614 may connect to the server 622 using the same connection.

Representatives A 602 and D 614 may be a polling managed node as discussed in relation to the polling method 400 depicted in FIG. 4. Representatives A 602 and D 614 may poll the server 622 for commands, data, files, and so forth that may be downloaded by a representative or a client. Representatives A 602 and D 614 may also send data to and receive data from the server 622. The data may include volunteered data or query-based requests as previously explained.

Each representative and client within the subnets 500 and 632 may include the query request parameter, the volunteer data parameter, and the batch time parameter (illustrated in FIG. 5). However, these parameters may not be utilized until a client is elevated to a representative. As previously explained, the volunteer and request parameters indicate the quantity of volunteer data and query-based requests a representative collects before sending such information to another representative or to the server. For example, a client 612*a* may send a query-based request to representative C 608. If the incoming query request causes the total number of query-based requests previously stored on representative C 608 to exceed the query request parameter, representative C 608 sends the query-based requests to representative B 606. Similarly, if the incoming requests sent from representative C 608 results in the total number of query-based requests to exceed representative B's 606 query request parameter, the requests are sent to representative A 602. For example, representative B 606 may be storing query-based requests previously received from its clients 610*a-c* or representative C 608. If the incoming requests sent from representative B 606 cause the total number of the requests to exceed representative A's 602 query request parameter, representative A 602 connects to the server 622 through the broker system 624, and sends the server 622 the query requests. For example, representative A 602 may be storing query-based requests previously sent from its clients 604*a-c* or representative B 606.

The responses to each of the query-based requests are sent from the server 622 to representative A 602. In one embodiment, representative A 602 sends responses to its clients 604*a-c* and to representative B 606. Representative B 606 sends responses to its clients 610*a-c* and to representative C 608. Representative C 608 sends responses to its clients 612*a-d*. The representatives and clients within the subnets 500 and 632 may send other requests or data (such as volunteer data) in a similar manner.

The representatives and clients may each include the batch time parameter (shown in FIG. 5). As previously explained, the batch time parameter indicates the length of time the representatives wait before sending requests received from clients and other representatives. For example, one of the clients 612*a-d* may send a query-based request to representative C 608. The addition of this new query-based request may not exceed the query request parameter as previously explained. However, the batch time parameter may indicate that the time interval has expired. In one embodiment, representative C 608 is required to send the requests to representative B 606 if its time interval has expired. If the batch time parameter of representative B 606 indicates a time expiration before the query request parameter is satisfied, representative B 606 sends the request to representative A 602. Similarly, if the batch time parameter of representative A 602 expires before the query request parameter is satisfied, representative A 602 sends the requests to the server 622.

When a client first achieves an active state (online, powered up, etc.), the client queries the representative that previously provided representation to verify whether or not the prior representative is still available to provide representation. For example, when the client 620*a* goes online, it may verify whether or not representative E 618, which previously represented the client 620*a*, is still available to continue providing representation for the client 620*a*. If the previous representative is not available, the client may query other representatives. If no such representative is available, the client 620*a* may choose to elevate itself as a representative as will be discussed in FIG. 7. However, if a representative is available to represent the client, the client may verify at predetermined time intervals whether or not the representative is still available to provide representation as discussed below.

Each representative and client may be installed with a verify parameter (shown in FIG. 5). As previously explained, the verify parameter may indicate how often a representative or client verifies if their current representative is still available to provide representation. For example, certain clients 612*a-d* may be installed with the verify parameter to verify at certain time intervals whether or not representative C 608 is still enabled to represent the clients 612*a-d*. Representative C 608 may not be able to continue representing the clients 612*a-d* because it has been removed from the subnet 500, gone offline, experienced a malfunction, etc. Also, representative B 606, for example, may verify at certain intervals, in accordance with its verify parameter, whether or not representative A 602 is still able to represent representative B 606.

Figure 8:
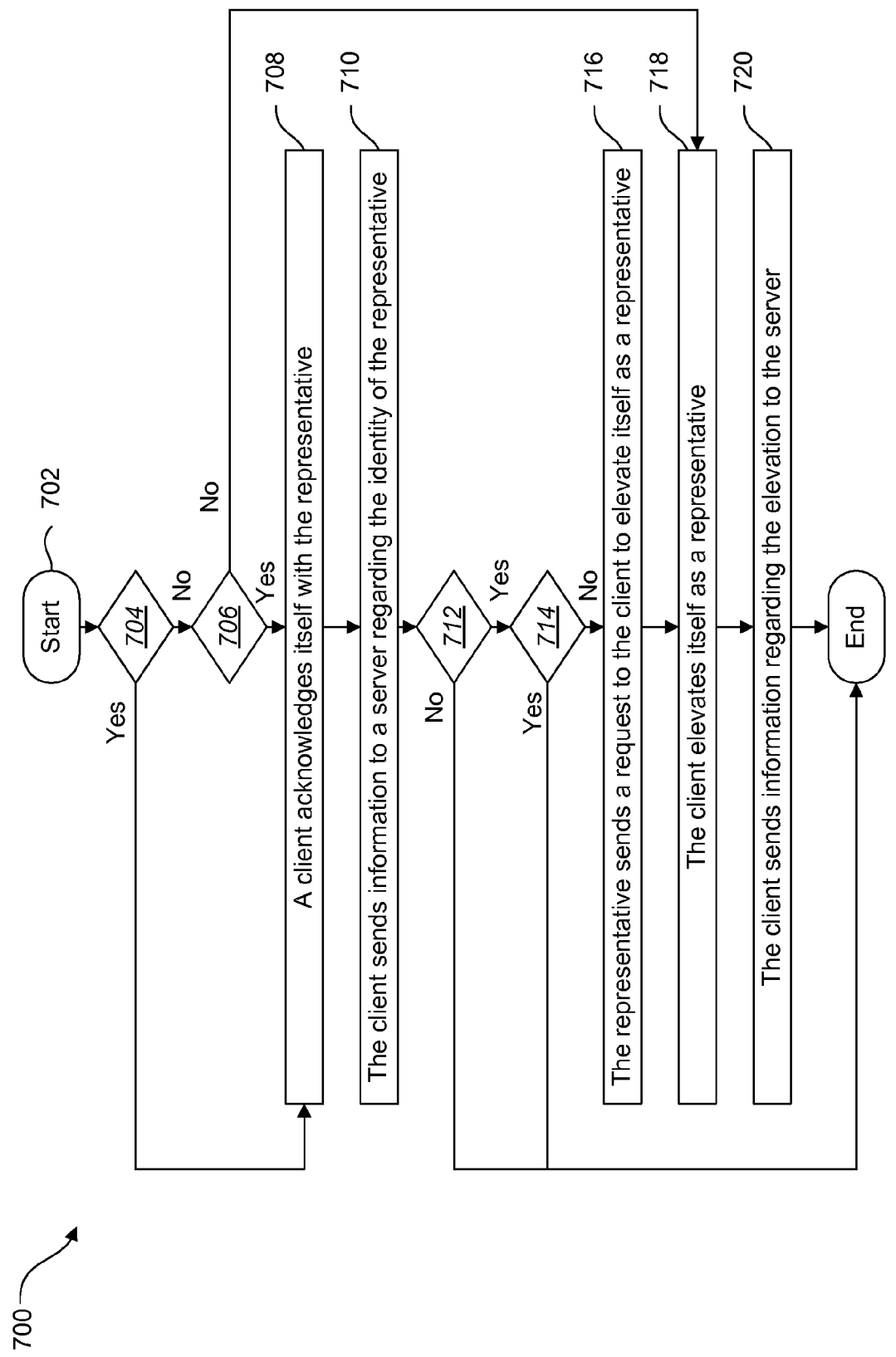
FIG. 8 is a flow diagram illustrating one embodiment of a client elevation method.

FIG. 8 is a flow diagram illustrating one embodiment of a client elevation method 700. The method 700 facilitates a client to be represented by a representative and for the representative to instruct the client to elevate itself to become a representative. The method 700 may be used in conjunction with the system 600 as previously discussed.

The method 700 starts 702 and the client verifies 704 whether or not the representative currently providing representation is still available to represent the client. In one embodiment, the client verifies 704 at certain time intervals in accordance with the verify parameter which may be included on the client. In another embodiment, the client verifies 704 whether or not the prior representative is available. For example, the client may have just reached an active state (online, powered up, etc.). If the current (or prior) representative is available, the client acknowledges 708 itself with the representative. In one embodiment, the client sends a message to the representative to apprise the representative that it is representing the client. However, if the current (or prior) representative is no longer able to represent the client, the client determines 706 if another representative is available to represent the client. For example, the client may send a query for the nearest representative (local broadcast). Or, if the method 700 is being executed in a switch environment (no local broadcast possibility), the client will query its own subnet for a representative. The first representative to respond to the local broadcast or the first representative found in the client's subnet will become the client's representative. In one embodiment, volunteer data and each query-based request from the client will pass through its representative. After the representative has responded to the broadcast or been discovered, the client acknowledges 708 itself with the representative. However, if no representative responds 706 to the broadcast or there is no representative in the client's subnet to represent the client, the method 700 proceeds and the client may elevate 718 itself as a representative. Once elevated, the client (now a representative) sends 720 information regarding the elevation of itself as a representative to a server. As previously explained, a representative may not respond to the client's broadcast if it is already representing the maximum number of clients according to the proxy client parameter of the representative.

After the client acknowledges 708 itself with the representative, the method 700 continues and the client sends 710 information to the server regarding the identity of the representative. The representative identity information may be sent to the server via the representative.

The method 700 continues, and the representative determines 712 if it is representing the maximum number of clients according to its client proxy parameter. As previously explained, the client proxy parameter indicates the quantity of clients the representative may represent. If the representative is not representing the maximum number of clients, the method ends. However, if the representative is representing the maximum number of clients, the representative determines 714 if an altitude maximum has been reached according to the maximum altitude parameter. As previously explained, the altitude parameter indicates the number of hierarchical levels a particular subnet may include. For example, the altitude parameter indicates how many levels of representatives the subnet may include. If the maximum altitude parameter has been reached, the method 700 ends. If the parameter has not been reached, the representative sends 716 a request to a client it is representing for the client to elevate 718 itself as a representative. When a client elevates 718 itself as a representative, it may now represent additional clients. After the client elevates 718 itself to become a representative, the client sends 720 information regarding the elevation to the server. The newly elevated client is in an altitude level that is one higher than the altitude level of the representative that sent 716 the elevation request.

Figure 9:
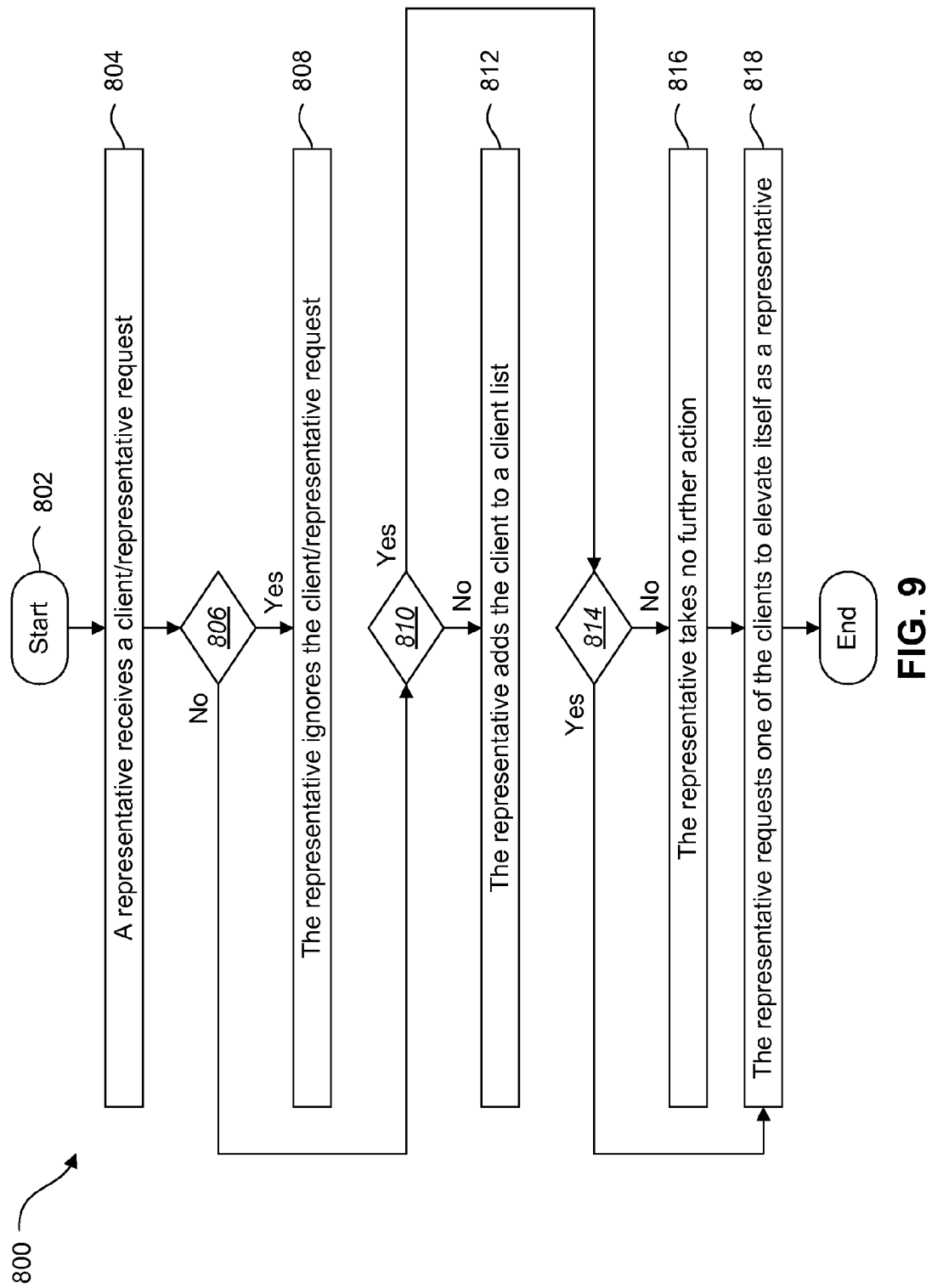
FIG. 9 is a flow diagram illustrating a further embodiment of a client elevation method.

FIG. 9 is a flow chart illustrating a further embodiment of a client elevation method 800. The method 800 starts 802 and a representative may receive 804 a client/representative request. In one embodiment, the client may send the client/representative request to request representation from the representative. When the representative receives 804 the request, the representative determines 806 if it has reached a maximum number of clients. For example, the client proxy parameter may limit the amount of clients the representative is able to represent. If the representative is representing the maximum number of clients indicated by the client proxy parameter, the representative ignores 808 the client/representative request. However, if the representative has not reached the maximum number of clients it is able to represent, the representative determines 810 if it has reached the (maximum number of clients—1). For example, the representative may be enabled to represent a maximum of four clients. When the representative receives 804 the request, if the representative determines 806 it is not currently representing four clients, the representative determines 810 if it is currently representing three clients. If the representative has not reached the (maximum number of clients—1), the representative adds 812 the client that sent the request to a client list. The client list contains a list of clients represented by a particular representative.

If the representative determines 810 that the (maximum number of clients—1) has been reached, the representative next determines 814 if the altitude level is less than a maximum altitude parameter installed in the representative. If the altitude level of the representative is not less than the maximum altitude parameter, the maximum hierarchy level has been reached and the representative adds the client to the client list and then takes no further action. However, if the altitude level is less than the maximum altitude parameter, the representative requests 818 one of the clients it is representing to elevate itself as a representative. In one embodiment, the representative requests 818 the client that sent the most recent client/representative request to elevate itself. In another embodiment, the representative requests 818 a client that did not send the most recent client/representative request to elevate itself. Once the client is elevated as a representative, it may perform the method steps of the method 800.

Figure 10:
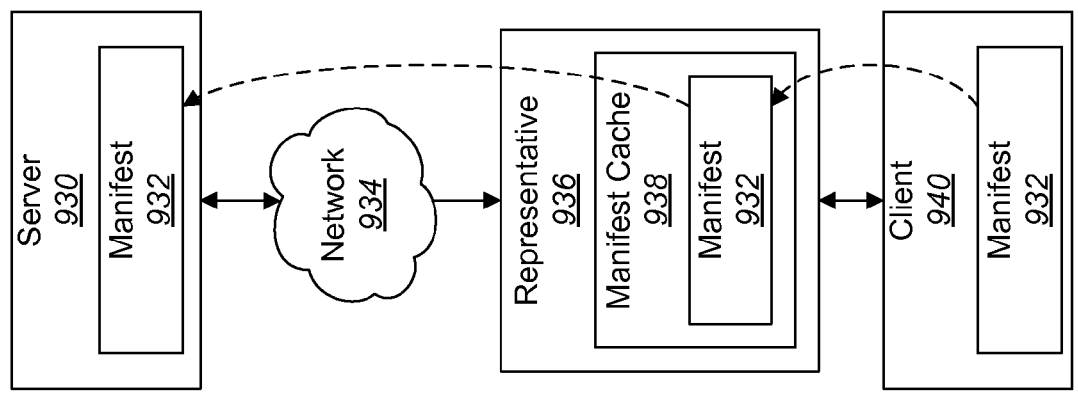
FIG. 10 is a block diagram illustrating a further embodiment of the representative and the client.

FIG. 10 is a block diagram illustrating one embodiment of a client 940 including a manifest 932. The manifest 932 may include data the client is volunteering to a server 930 or the manifest 932 may include a query based request from the client 940. A representative 936 may add the manifest 932 to manifest cache 938. The representative 936 may send the manifest 932 to the server 930 over a network 934.

Figure 11:
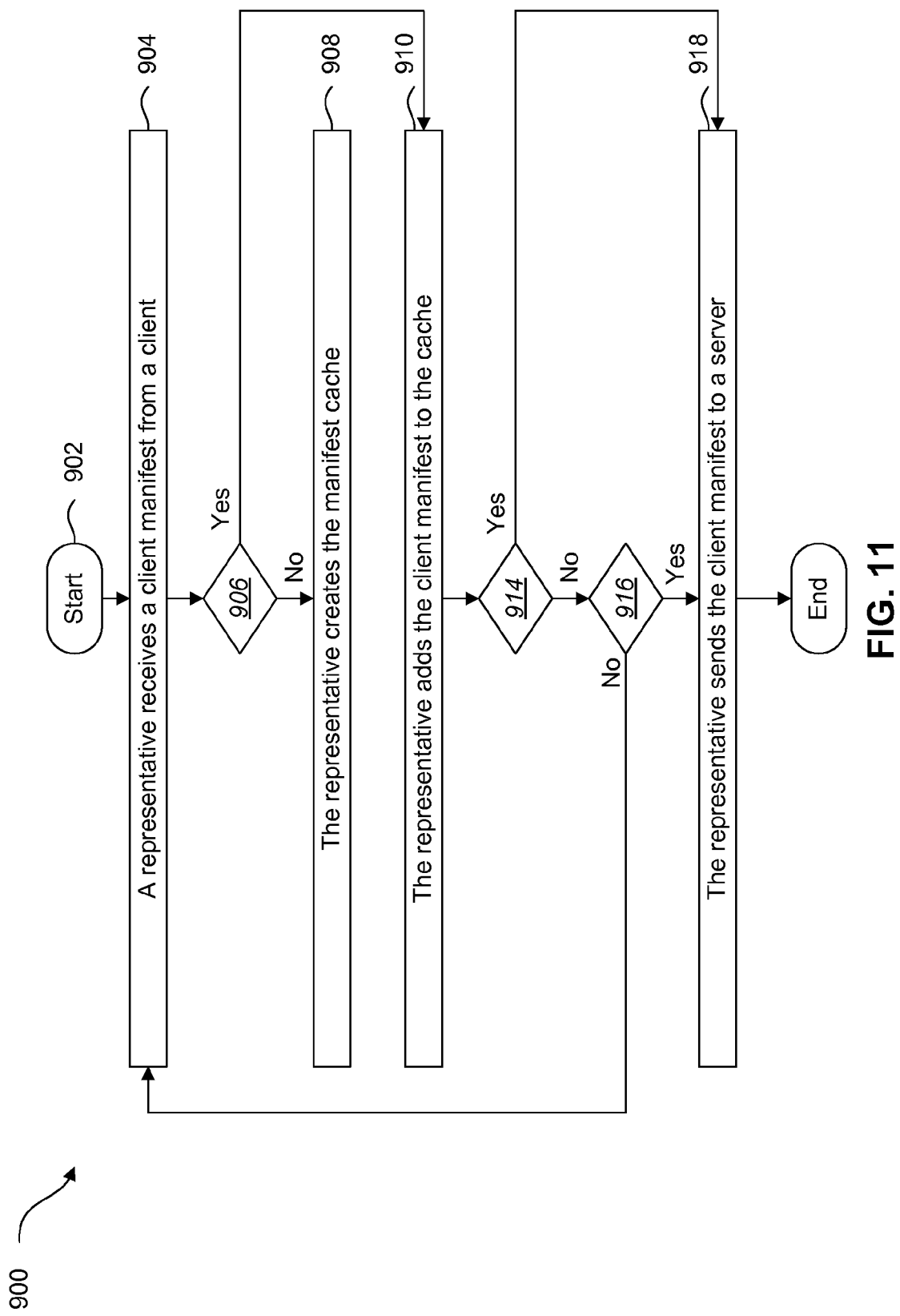
FIG. 11 is a flow diagram illustrating one embodiment of a method to send requests from a client to a server via a representative.

FIG. 11 is a flow diagram illustrating one embodiment of a method 900 to send requests from a client to a server via a representative. The method 900 starts 902 with the representative receiving 904 a client manifest from the client. After the representative receives 904 the manifest, the representative determines 906 if a manifest cache exists. The representative may store the manifest in the cache until the manifest is sent to the server. For example, the representative may store the manifest until the query request parameter, the volunteer data parameter, or the time batch time parameter is satisfied. If the manifest cache does not exist, the representative creates 908 the manifest cache and adds 910 the client manifest to the newly created cache. If the representative determines 906 that the manifest cache already exists, the client manifest is simply added 910 to the cache.

The representative determines 914 if a manifest parameter has been met. The manifest parameter may include the query request parameter, the volunteer data parameter, and the batch time parameter as previously explained. These parameters indicate the quantity of client manifests that may be stored within the cache or the time interval that is satisfied before the representative sends the stored manifests to the server. For example, the manifest parameter may indicate that three volunteering manifests may be cached and only one query-based manifest may be cached. If the representative receives 904 a first volunteering manifest, the manifest will be stored in cache. If the representative next receives 904 a first query-based manifest, it will be sent immediately to the server. In one embodiment, the first volunteering manifest is not sent to the server with the query-based manifest because the manifest parameter indicates that three volunteering manifests may be cached before the representative sends such manifests to the server.

If the representative determines 914 that the manifest parameter has not been met, the representative next determines 916 if batch time parameter has been satisfied. The batch time parameter indicates the amount of time the various manifests may be stored in cache before the representative sends such manifests to the server. If the batch time parameter has not been satisfied, the representative receives 904 a client manifest from a client and the method 900 proceeds as previously discussed. If the batch time parameter has been satisfied, the representative sends 918 all the cached manifests to the server. In another embodiment, the representative only sends a certain type of manifest to the server, e.g. volunteered data or a query-based manifest.

Figure 12:
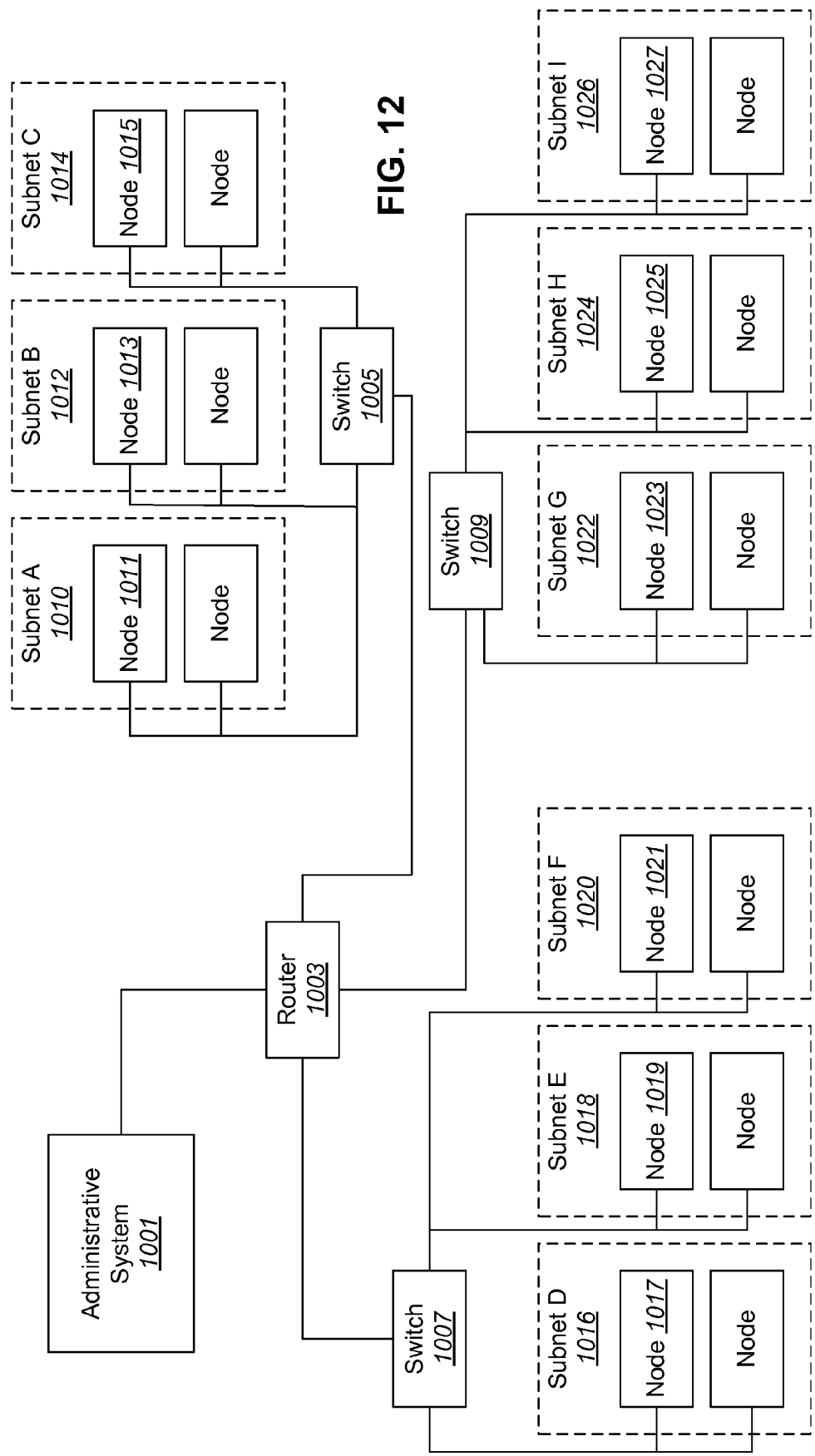
FIG. 12 is an exemplary block diagram illustrating a computer network on which the present systems and methods may be implemented.

FIG. 12 is an exemplary block diagram illustrating a computer network on which the present systems and methods may be implemented. In FIG. 12, an administrative system 1001 connects to a router 1003.

The router 1003 may be connected to three switches: a first switch 1005, a second switch 1007 and a third switch 1009. Each switch 1005, 1007, and 1009 connects to three subnets. The first switch 1005 connects to three subnets 1010, 1012, and 1014. The second switch 1007 connects to three subnets 1016, 1018, and 1020. The third switch 1009 connects to three subnets 1022, 1024, and 1026. A network groups may be embodied in a wide variety of configurations and may include a local area network, a subnet 1010, 1012, and 1014, or a group of subnets 1010, 1012, and 1014. The network nodes or elements 1011, 1013, 1015, 1017, 1019, 1021, 1023, 1025 and 1027 represent computer systems or devices on the computer network. One or more of the nodes may use embodiments of the systems and methods described herein. The network may include both wired and wireless connections to nodes or elements 1011, 1013, 1015, 1017, 1019, 1021, 1023, 1025 and 1027 within the network.

Figure 13:
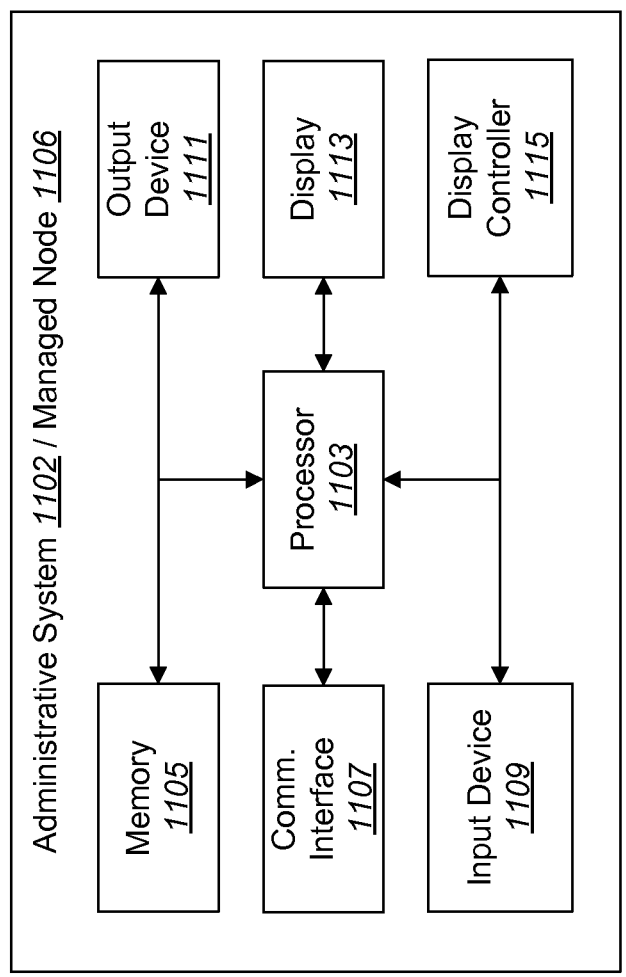
FIG. 13 is a block diagram illustrating the major hardware components typically utilized in an administrative system and/or a managed node.

FIG. 13 illustrates various components that may be utilized in an administrative system 1102 and/or a managed node 1106. The illustrated components may be located within the same physical structure or in separate housings or structures.

The administrative system 1102 and/or managed node 1106 includes a processor 1103 and memory 1105. The processor 1103 controls the operation of the administrative system 1102 and/or managed node 1106 and may be embodied as a microprocessor, a microcontroller, a digital signal processor (DSP) or other device known in the art. The processor 1103 typically performs logical and arithmetic operations based on program instructions stored within the memory 1105.

The administrative system 1102 and/or managed node 1106 typically also includes one or more communication interfaces 1107 for communicating with other electronic devices. The communication interfaces 1107 may be based on wired communication technology, wireless communication technology, or both. Examples of different types of communication interfaces 1107 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 1102 and/or managed node 1106 typically also includes one or more input devices 1109 and one or more output devices 1111. Examples of different kinds of input devices 1109 include a keyboard, mouse, microphone, remote control device, button, joystick, trackball, touchpad, lightpen, etc. Examples of different kinds of output devices 1111 include a speaker, printer, etc. One specific type of output device which is typically included in a computer system is a display device 1113. Display devices 1113 used with embodiments disclosed herein may utilize any suitable image projection technology, such as a cathode ray tube (CRT), liquid crystal display (LCD), light-emitting diode (LED), gas plasma, electroluminescence, or the like. A display controller 1115 may also be provided, for converting data stored in the memory 1105 into text, graphics, and/or moving images (as appropriate) shown on the display device 1113.

Of course, FIG. 13 illustrates only one possible configuration of a administrative system 1102 and/or managed node 1106. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for polling an administrative system for one or more managed nodes, the method being implemented by a computer system, the method comprising:
    connecting to the administrative system;
    polling the administrative system for data to be downloaded;
    sending, by a managed node, a node list to the administrative system, wherein the node list comprises the identity of managed nodes in a subnet;
    receiving, at the managed node, a connect list of managed nodes from the administrative system, wherein the connect list comprises one or more managed nodes in both the node list and a push list that identifies one or more managed nodes the administrative system attempted to push data to; and
    multicasting, by the managed node, the connect list to one or more other managed nodes within the subnet.

2. The method of claim 1, wherein connecting to the administrative system comprises connecting through a broker system.

3. The method of claim 1, further comprising the administrative system attempting to push data to the one or more managed nodes in the push list.

4. The method of claim 1, further comprising the administrative system comparing the node list and the push list for one or more managed nodes included in both the node list and the push list.

5. The method of claim 1, further comprising the one or more managed nodes included in the connect list connecting to the administrative system through a broker system.

6. The method of claim 1, further comprising the administrative system pushing the data to the one or more nodes connected to the administrative system through a broker system.

7. The method of claim 1, further comprising installing a polling agent on each of the one or more managed nodes.

8. A non-transitory computer-readable medium comprising executable instructions for polling an administrative system for one or more managed nodes, wherein the instructions are executable to:
    connect to the administrative system;
    poll the administrative system for data to be downloaded;
    send, by a managed node, a node list to the administrative system, wherein the node list comprises the identity of managed nodes in a subnet;
    receive, at the managed node, a connect list of managed nodes from the administrative system, wherein the connect list comprises one or more managed nodes in both the node list and a push list that identifies one or more managed nodes the administrative system attempted to push data to; and
    multicast, by the managed node, the connect list to one or more other managed nodes within the subnet.

* * * * *